Sept. 3, 1968 R. L. HOGUE 3,399,554
LOCKOUT PREVENTER FOR AUTOMOTIVE VEHICLES
Filed May 20, 1966

INVENTOR
RONALD L. HOGUE
BY
Arnold & Roylance
ATTORNEYS

United States Patent Office 3,399,554
Patented Sept. 3, 1968

3,399,554
LOCKOUT PREVENTER FOR
AUTOMOTIVE VEHICLES
Ronald L. Hogue, Box 4, Weiner, Ark. 72479
Filed May 20, 1966, Ser. No. 551,812
7 Claims. (Cl. 70—262)

ABSTRACT OF THE DISCLOSURE

A lockout preventing system for automotive vehicles which absolutely assures that the vehicle doors cannot be unintentionally locked from outside the vehicle while the key is in the ignition. The system includes only a first switch which is closed only when a door of the vehicle is open and only a second switch which is closed only when a key is in the ignition switch, regardless of the position of the ignition switch or whether or not the motor of the vehicle is running. Thus, it is assured that the vehicle doors cannot be inadvertently locked from the outside while the doors can be locked at any time by one having an extra key even when a key is in the ignition switch. Therefore, it is possible for the owner of the vehicle to start the engine, as on a cold morning, and still lock all the doors from the outside with an extra key.

---

This invention relates to an improved system for preventing unintentional locking of the doors of an automotive vehicle.

Specifically, the invention relates to a system for preventing unintentional locking of at least one door (preferably the driver's door) of an automobile by a person leaving the automobile so long as the ignition key of the vehicle is still in the ignition switch and which permits normal operation of the door lock mechanism at all other times. The invention is an improvement over the invention of U.S. Patent No. 2,105,350, Fitzgerald, issued Jan. 11, 1938. Fitzgerald recognized the need for a lockout preventer which prevents unintentional locking of automobile doors by a person leaving the vehicle whenever the ignition key of the vehicle is in the ignition switch. In one embodiment of the Fitzgerald device, the arrangement is such that the bolt which normally holds the automobile door closed is held in an inoperable position so that the door of the automobile will not remain closed whenever the ignition key is in the ignition switch and the ignition switch is off. In a second embodiment of the Fitzgerald device, there is a lock preventing mechanism which prevents manipulation of the door locking button or other locking control so long as the ignition key is in the ignition switch and the switch is off. Since the lock preventing mechanism is inactive when there is a key in the ignition switch and the ignition switch is turned on, the occupants of the vehicle can lock the doors of the vehicle when the vehicle is driven.

However, the Fitzgerald arrangement has some inherent disadvantages which are completely eliminated in the system of the present invention. A primary disadvantage of the first embodiment of Fitzgerald is that the door of the automobile cannot be closed at all so long as the ignition key is in the ignition switch and the switch is off. In fact, with the arrangement of the first embodiment of Fitzgerald, it would be necessary to either turn on the ignition switch or remove the key from the ignition switch before the door could be closed even from inside of the automobile.

Among the disadvantages of the second embodiment of the Fitzgerald device are that all the doors of the automobile are automatically unlocked whenever the ignition switch is turned to its OFF position and the doors of the automobile cannot be again locked until the key is either removed from the ignition switch or the ignition switch is turned ON. Hence, an intruder can easily gain access to the vehicle whenever the key is in the ignition and the ignition switch is off. In addition, the arrangement of Fitzgerald is such that, whenever the key is in the ignition switch and the switch is off, the electromagnet which operates the lock preventer is actuated. Hence, should the owner of a vehicle, who frequently leaves the ignition key in the ignition switch, leave the key there for an extended period of time, the battery of the vehicle would soon become discharged.

In addition, with the second embodiment of the Fitzgerald system, the antilocking device remains unactuated whenever the ignition switch is on. Hence, a driver inadvertently leaving the vehicle for a short time while the motor is running, could easily lock himself out of the vehicle and then be unable to gain entry to the vehicle since, if the motor is running, the ignition key is normally in the ignition switch.

Applicant's invention overcomes the shortcomings of the Fitzgerald systems as well as the other previously known systems for preventing unintentional locking of the vehicle doors.

Correspondingly, an object of this invention is to provide an improved system for preventing unintentional locking of automotive vehicle doors which is actuated only upon the simultaneous occurrence of two conditions.

Another object is a system, according to the first object, in which one of the two conditions is a position of a door of the vehicle in other than its normally closed position.

Another object is a system according to the first object in which one of the two conditions is the presence of a key in the ignition lock of a motor vehicle, and the other of the two conditions is the position of a door of the vehicle in other than its normally closed position.

A further object is an arrangement for preventing unintentional locking of an automobile door of the type which can be locked from outside the vehicle without a key, and in which the mechanism for preventing the unintentional locking is actuated only when the ignition key of the vehicle is in the ignition switch and the door of the vehicle is open.

A further object is to provide an electrically operated mechanism for preventing the unintentional locking of the door of an automotive vehicle, the system including an electrically operated motor which takes the form of a solenoid, a first switch associated with the ignition switch of the vehicle and which is closed whenever the ignition key is in the ignition switch, and a second switch which is open whenever the door or doors of a vehicle are closed and is closed to complete the electric circuit through the first switch to actuate the antilocking mechanism whenever the door of the vehicle is open.

In order that the manner in which the foregoing and other objects are attained in accordance with the invention can be understood in detail, particularly advantageous embodiments thereof will be described with reference to the accompanying drawings, which form a part of this specification, and wherein.

There are several types of door locking mechanisms commonly in use on automotive vehicles. In one type (normally found on vehicles made by General Motors Co.) there is a reciprocable shaft which extends upwardly through the bottom of the window frame and has a lock operating knob at its end. Depressing the knob locks the vehicle door by disconnecting the outside door handle from the door opening mechanism. A door with this type of lock can be locked from outside the vehicle by first depressing the operating knob and then holding the outside door handle or button down while closing the door. The door can also be locked from outside the vehicle with a key and of course, requires a key to unlock the door from outside the vehicle. In addition, the door can be locked from inside the vehicle by depressing the lock operating knob, and can be unlocked by either lifting the knob or opening the door by manipulating the door opening lever located on the inside of the door.

In another type of automobile door lock, there is a locking lever on the inside of the door. To lock the door from outside the vehicle, the lever is moved to lock position and the door is locked merely by closing same without the need for manipulation of the outside door handle. The door can also be locked and unlocked with a key.

Although the lock preventing system of this invention is shown and described as applied to the type of door lock mechanism normally found on vehicles made by General Motors Co., it is to be appreciated and understood that the lockout preventing system has equal utility with other types of door locking mechanisms for automotive vehicles.

Figure 1:
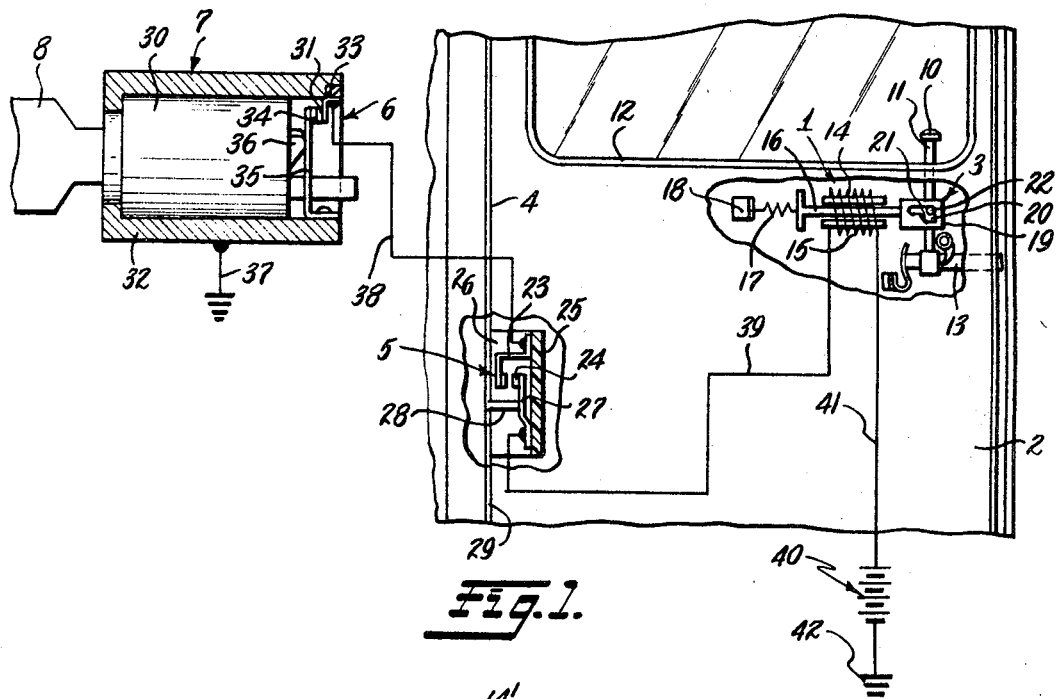
FIG. 1 is a view showing the door of an automotive vehicle with portions thereof cut away to show the door latch mechanism and the details of a door switch, and also showing a partial sectional view of an ignition lock.
Figure 3:
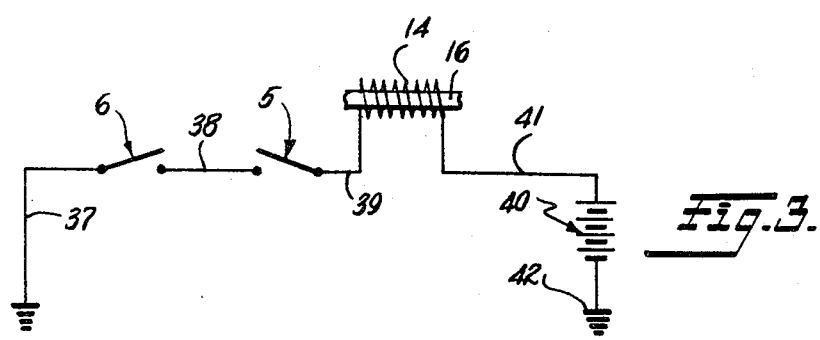
FIG. 3 is a schematic drawing of the circuitry of this invention.

Referring now to the drawings in detail and particularly, FIGS. 1 and 3, there is shown a lockout preventing arrangement in accordance with this invention. The lockout preventing system includes a lock preventing device 1 mounted in a door 2 of the vehicle adjacent a door locking mechanism 3. Also mounted in vehicle door 2 adjacent the hinge edge 4 of the door is a first switch 5. In addition, there is a second switch 6 associated with the ignition lock 7 of the vehicle in such a manner that the second switch is closed whenever a key 8 is present in the ignition lock.

Door locking mechanism 3 is of the type wherein the driving connection between the handle on the outside of the door and the door latching is disrupted by the depression of a knob 10 on the inside of the door, the knob 10 being mounted on the end of a shaft 11 which extends through the lower portion 12 of the window frame of the door. Although door locking mechanism 3 is shown as cooperating with a reciprocating latch bolt 13, it is to be understood that the door latch element could be of the more recent rotary type. Since the details of the linkages and connections through which the depression of knob 10 and shaft 11 disrupts the connection between the outside handle and door latch mechanism 3 form no part of this invention, these linkages are not shown or described.

Lock preventing device 1 includes an electromagnetic motor in the form of a solenoid 14 with a coil 15 wound on a suitable sleeve. Extending through coil 15 is a slide member 16 of magnetic material, the lefthand end of which is connected to a tension spring 17 anchored to door 2 as at 18 so that spring 17 urges slide member 16 to the left to position of FIG. 1 whenever solenoid 14 is unenergized. At the righthand end of slide 16 is an enlarged head 19 of generally rectangular outline provided with an opening 20. Opening 20 is of generally triangular configuration, and the bottom edge of the opening provides a curved cam face 21.

A pin 22, fixed to lock operating shaft 11, projects transversely from the shaft and extends through opening 20. As shown at FIG. 1, knob 10 is in its upper position wherein the door is unlocked and in this position pin 22 is adjacent the upper edge of opening 20. When knob 10 is depressed, the pin moves to a lower position adjacent cam face 21 of opening 20. However, when solenoid 14 is energized, slide 16 moves to the right (as viewed in FIG. 1) to correspondingly move head 19 to the right. During such movement, cam face 21 engages pin 22 to move latch operating shaft 11 and knob 10 upwardly to their upper positions in which the door is unlocked.

Switch 5 includes a stationary contact 23 and a movable contact 24. Movable contact 23 is fixed to a base 25 of insulating material, which in turn is mounted on casing 26 of switch 5. Movable contact 24 is mounted on a spring arm 27 fixed to base 25. Spring arm 27 normally urges movable contact 24 into engagement with stationary contact 23 and hence, switch 5 is of the normally closed type. An operating rod 28 is arranged to engage spring 27 to open the switch contacts when the operating rod is moved axially toward base 25. Casing 26 is fixed to hinge edge 4 of the door so operating rod 28 extends through a suitable opening 29 in the hinge edge of the door. Whenever the door is open, operating rod 28 is urged outwardly by spring arm 27 and the contacts of switch 5 are closed. However, when door 2 is closed, the tip of operating rod 28 engages the face of door jamb 29 to move movable contact 24 away from stationary contact 23, so the switch is open.

Ignition lock 7 includes a conventional lock cylinder 30. Second switch 6 has a stationary contact 31 mounted on lock casing 32 by an insulating block 33 so that stationary contact 31 is electrically insulated from the casing. A movable contact 34 is mounted on a spring arm 35, spring arm 35 normally urging contact 34 away from contact 31 so that second switch 6 is normally open. Spring arm 35 is adapted to be engaged by the tip 36 of key 8 to close second switch 6 whenever key 8 is in ignition lock 7. It is to be noted that spring arm 35 is enlarged transversely of the axis of lock cylinder 30 so that the tip 36 of key 8 engages the spring arm regardless of the rotational position of key 8 and lock cylinder 30. Hence, contacts 31 and 34 of second switch 6 are closed whenever key 8 is in the ignition lock in both an ON and OFF position of the ignition switch. (Since the contacts of the ignition switch form no part of this invention, they are not shown or described.)

Casing 32 of ignition lock 7 is formed of metal and is grounded to the vehicle frame by wire 37. Stationary contact 31 of second switch 6 is electrically connected to stationary contact 23 of switch 5 by wire 38. One side of coil 15 of solenoid 14 is connected to movable contact 24 by wire 39. The other side of coil 15 is connected to the "hot" side of battery 40 of the motor vehicle by wire 41. The other side of battery 40 is grounded as at 42 in the normal manner to the chassis of the vehicle. The circuit arrangement is shown schematically at FIG. 3 using the same identifying numerals used with regard to FIG. 1.

With reference to FIG. 3, it is apparent that solenoid 14 is energized to operate slide 16 only when both switches 5 and 6 are closed. Since switch 5 is closed only when door 2 of the vehicle is open, and since switch 6 is closed only when key 8 is in the ignition lock, solenoid 14 operates the lock preventing mechanism only when both these conditions exist simultaneously.

Hence, knob 10 can be lifted or depressed manually from inside the vehicle in the normal manner even if key 8 is in the ignition switch, so long as door 2 is closed. It is also to be appreciated that since solenoid 14 remains unenergized, because switch 5 is open whenever the door is closed, that there is no danger of discharging vehicle battery 40 merely by leaving ignition key 8 in the ignition lock.

Figure 2:
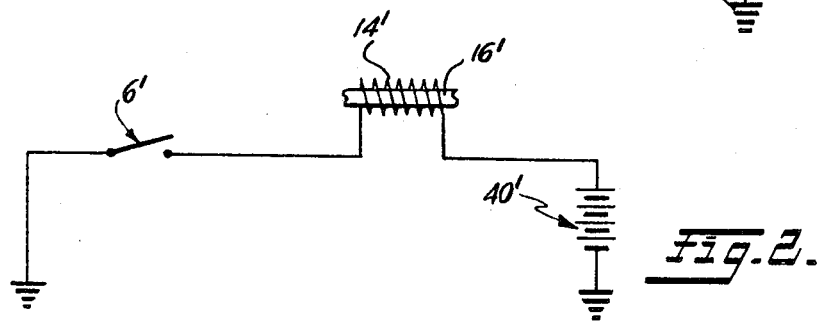
FIG. 2 is a schematic drawing of the prior art system, as shown at FIG. 1 of U.S. Patent 2,105,350, Fitzgerald.

FIG. 2 shows the prior art system disclosed in U.S. Patent 2,105,350, Fitzgerald. Observe that only second switch 6' is provided in the electrical circuit for operating the lock preventing mechanism. Switch 6' of Fitzgerald is substantially the same as the switch 6 of this invention save that the switch 6' (as shown at FIGS. 5 and 6 of the Fitzgerald patent) is arranged to open when the lock cylinder of Fitzgerald is turned to a position in which the ignition switch is ON. The switch 6 of the present invention remains ON continuously whenever key 8 is in the ignition lock. In the prior art arrangement of FIG. 2, the solenoid 14' is energized whenever the ignition key is in the ignition lock and the lock is in an ignition OFF position. Hence, the doors of a vehicle equipped with the Fitzgerald system not only automatically unlock whenever the key is inserted in the ignition lock or when the ignition switch is turned OFF but in addition, solenoid 14' remains energized. Hence, a parking lot attendant, not familiar with the automatic lock preventing system, may inadvertently discharge the battery 40' of a vehicle equipped with the Fitzgerald lock preventing system by merely leaving the key in the ignition switch.

With the arrangement of the present invention, the possibility of inadvertently discharging the vehicle battery or inadvertently locking oneself out of the vehicle, either when the ignition switch is ON or OFF, is completely eliminated and in addition, the locking mechanism of the door can be operated in its normal manner so long as the door is closed even when a key is in the ignition switch.

Although a specific arrangement of the unintentional locking system of this invention for the door of a motor vehicle has been shown and described, it is to be understood that numerous changes can be made in the disclosed system without departing from the scope of this invention. For example, a sensing device other than switch 5 could be employed to sense that door 2 is closed. In addition, an arrangement other than switch 6 could be used to sense the presence of key 8 in the ignition switch. Also, rather than an electrically actuated solenoid 14 to operate the lock preventing device, it is within the purview of this invention to use an electric, hydraulic or pneumatic motor to obtain the same advantages described herein.

Further, although the lock preventing device has been shown and described as connected to the door lock knob shaft per se of the vehicle, it is contemplated, and hence within the scope of this invention, to arrange the lock preventer so that the outside handle of the vehicle cannot be depressed when a key is in the ignition lock and the door is open. By virtue of the mode of operation of the lock mechanism for General Motors type automobiles, the door of the auto does not lock unless the outside door handle is depressed when the door is closed. Hence, arranging the lock preventer to prevent depressing the outside door handle when the ignition key is in the ignition lock and the door open would prevent inadvertent locking of the door as effectively as the arrangement shown and described herein.

I claim:

1. In an automotive vehicle having a door provided with a door lock mechanism, the combination comprising lock preventing means associated with the door lock mechanism of at least one door of the vehicle and operable to a condition to prevent locking the vehicle door;
operating means operatively associated with said lock preventing means to operate same to said condition; and
means to actuate said operating means and including only
first means responsive to opening the door of the vehicle, and
second means associated with the ignition lock of the vehicle.

2. Apparatus according to claim 1, wherein said door lock mechanism is of the type which is movable to a first position to lock the door of the vehicle, and
a second position in which the vehicle door is unlocked; and
said lock preventing means includes
means to move said lock mechanism to said second position whenever said lock preventing means is operated.

3. Apparatus according to claim 1, wherein said operating means is a motor; and
said lock preventing means includes a stop element to prevent operation of said door lock mechanism to a locked condition.

4. Apparatus according to claim 1, wherein said first means responsive to opening the door of the vehicle is an electric switch.

5. Apparatus according to claim 4, wherein said second means is an electric switch operated in response to the presence of a key in the ignition lock of the vehicle.

6. In an automotive vehicle having a driver's door provided with a lock mechanism of the type which can be locked from inside the vehicle and outside the vehicle without a key, and which can also be locked from outside the vehicle with a key, the combination comprising
lock preventing means associated with at least the door lock mechanism of the driver's door of the vehicle and operable to a condition to prevent locking the driver's door;
a power source on the vehicle;
motor means operatively associated with said lock preventing means to operate same to said condition to prevent locking said driver's door; and
means connecting said motor means to said power source and including only
a first switch operable to a closed condition only when said driver's door is moved to an open position, and
a second switch operable to a closed condition whenever a key is present in the ignition switch of the vehicle regardless of the position of the ignition switch;
said motor means operating said lock preventing means to said lock preventing condition only when said first and second switches are in said closed condition;
whereby, at least the driver's door of the vehicle can be locked from inside the vehicle whenever the door is closed and can be locked from outside the vehicle with a key even when a key is present in the ignition switch, regardless of whether or not the motor is running, and unintentional locking of the door is completely defeated.

7. Apparatus according to claim 6 wherein
said power source is a battery; and
said motor means is an electromagnet.

References Cited

UNITED STATES PATENTS 2,105,350  1/1938  Fitzgerald _____ 70—264
2,613,258  10/1952  Azano _____ 70—264

MARVIN A. CHAMPION, *Primary Examiner.*

R. L. WOLFE, *Assistant Examiner.*